United States Patent Office 3,111,039
Patented Nov. 19, 1963

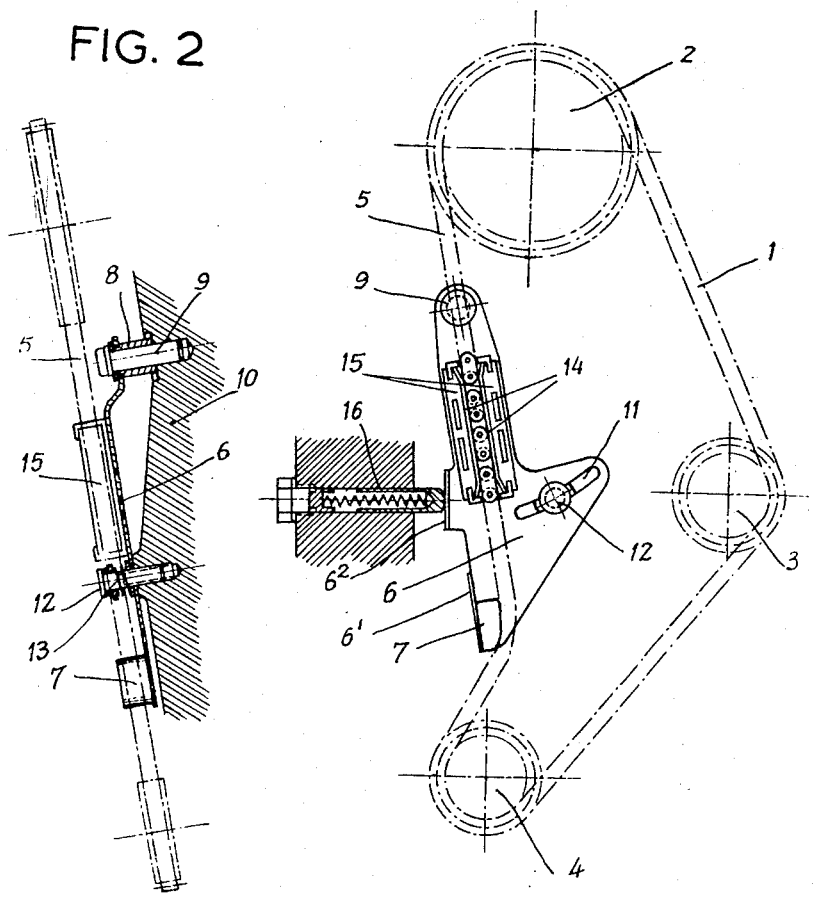

3,111,039
AUTOMATIC CHAIN TENSIONING DEVICE
Lucien Péras, Billancourt, France, assignor to Regie Nationale des Usines Renault, Billancourt, France
Filed Nov. 14, 1960, Ser. No. 68,779
Claims priority, application France Nov. 18, 1959
7 Claims. (Cl. 74—242.11)

The present invention relates in general to chain tensioners of the type used more particularly for the valve timing of internal combustion engines, and has specific reference to improvements in self-adjusting or automatic tensioners which consist in providing simple constructional characteristics with a view to reduce manufacturing costs and improve the reliability of these devices. These improvements consist essentially in mounting on the cylinder block a support carrying a friction shoe engaging the slack or idle span of the chain, said support being pivotally mounted with its pivot axis located very close to the camshaft wheel, whereby a practically reasonable inclination of the residual slack span may be preserved to permit the use of vibration dampers, the tensioner support being urged against the chain by a hydraulic piston or a spring and comprising a non-recoil device.

In order to afford a clearer understanding of this invention and of the manner in which the same may be embodied in practice, reference will now be made to the accompanying drawings illustrating diagrammatically by way of example one embodiment of the chain tensioning device constituting the subject-matter of this invention.

In the drawings:

FIGURE 1 is a fragmentary side elevational and part-sectional view showing a chain tensioning device constructed according to the teachings of this invention;

FIGURE 2 is a fragmentary section showing the same device but taken upon a plane at right angles to the plate support of the device.

Referring to FIGS. 1 and 2 of the drawings, the timing chain 1 of this example passes over toothed wheels or sprockets 2, 3, 4, wheel 2 driving the overhead camshaft of the engine (not shown). Mounted on the slack or idle span 5 of the chain is the tensioning device consisting of a plate support 6 cut and pressed from steel sheet stock of adequate thickness, this support 6 having bent marginal portions or lugs 6¹, 6² approximately of the shape illustrated in FIG. 1. This plate support further comprises at one end a friction shoe or pad 7 and, at its opposite end, an offset socket 8 mounted on a pivot pin 9 carried by the cylinder block 10. The plate support 6 is thus adapted to pivot about the axis of pivot pin 9 and this movement is guided by a curved slot 11 formed in the plate and engaged by a fixed stub 12 carried by the cylinder block, a light coil spring 13 being interposed between the head of stud 12 and the plate support 6, as shown in FIG. 2.

The slack span 5 of chain 1 is guided along its upper rectilinear portion in the plate support 6 by being caused to travel between a pair of parallel guide plates 14 carried by the plate support 6 and mounted on rubber blocks 15 constituting vibration dampers. It may be noted that the pivot pin 9 of the chain tensioner of this invention is located in the rectilinear portion of the slack span 5 which extends between the friction pad 7 and the wheel or sprocket 2 keyed on the overhead camshaft, and in close vicinity of this wheel or sprocket.

With the pivot pin located as defined hereinabove a practically reasonable alignment of the slack or idle span of the chain may be preserved in relation to the vibration absorbers or dampers.

The automatic adjustment of the chain tension is obtained either by means of a hydraulic piston responsive to the pressure of the lubrication system of the engine, or by means of any other adequate spring device.

A non-recoil device 16 of the piston type is mounted on the cylinder block and engages the bent marginal portion or lug 6² of the plate support 6. This non-recoil device may be a spring-loaded member.

The above-described chain tensioning device is characterized by many advantages with respect to the hitherto known devices. It constitutes a self-contained self-adjusting tensioner comprising only simple, easy-to-mount mechanical component elements, ensuring a satisfactory tensioning action free of any maintenance and therefore highly reliable. Except for the normal wear of the rubber friction pad, the wear-and-tear factor of the other parts of the device is practically negligible.

A regular oil splash on the pivot pin is sufficient to ensure a long useful life thereof.

If desired, a rubber roller formed with an adequate guiding section, or a toothed sprocket, may be substituted for the rubber pad illustrated.

Of course, many modifications and alterations may be brought to the form of embodiment shown and illustrated herein by way of example, without departing however from the spirit and scope of the invention as set forth in the appended claims.

I claim:

1. In combination, sprocket wheels of an internal combustion engine including a camshaft sprocket wheel, a timing chain rotatably carried by said wheels and driving said camshaft sprocket wheel, a cylinder block, a pivot pin disposed on said block and extending parallel to the camshaft sprocket wheel axis, an elongated support member having one end pivotally connected to said pivot pin, a friction element on the other end of said support member, said timing chain having a slack portion, said friction element being disposed to frictionally contact and engage the slack portion of said chain, a guide plate on said support member engaging the slack portion of said chain to act as a vibration damper, tensioning means acting on said friction element to maintain it in frictional contact with the chain as it moves thereby, the pivot pin axis being disposed on said block with respect to said camshaft sprocket wheel, to the friction element and to the guide plate so said guide plate and said slack portion of the chain remain in substantial alignment.

2. In combination, sprocket wheels of an internal combustion engine including a camshaft sprocket wheel, a timing chain rotatably carried by said wheels and driving said camshaft sprocket wheel, a cylinder block, a pivot pin disposed on said block and extending parallel to the camshaft sprocket wheel axis, an elongated support member having one end pivotally connected to said pivot pin, a friction element on the other end of said support member, said timing chain having a slack portion, said friction element being disposed to frictionally contact and engage the slack portion of said chain, a guide plate on said support member engaging the slack portion of said chain to act as a vibration damper, tensioning means acting on said friction element to maintain it in frictional contact with the chain as it moves thereby, the pivot pin axis being disposed on said block to substantially intersect said slack portion near said camshaft sprocket wheel and at a point located between the camshaft sprocket wheel and the friction element, and said guide plate being disposed on said support member between the pivot pin axis and the friction element.

3. In combination, sprocket wheels of an internal combustion engine including a camshaft sprocket wheel, a timing chain rotatably carried by said wheels and driving said camshaft sprocket wheel, a cylinder block, a pivot pin disposed on said block and extending parallel to the camshaft sprocket wheel axis, an elongated support member having one end pivotally connected to said pivot pin, a friction element on the other end of said support member, said timing chain having a slack portion, said friction element being disposed to frictionally contact and engage the slack portion of said chain, a guide plate on said support member engaging the slack portion of said chain to act as a vibration damper, tensioning means acting on said friction element to maintain it in frictional contact with the chain as it moves thereby, the pivot pin axis being disposed on said block to substantially intersect said slack portion near said camshaft sprocket wheel and at a point located between the camshaft sprocket wheel and the friction element, and said guide plate being disposed on said support member between the pivot pin axis and the friction element, said support member comprising a cut and folded shut steel plate with a lateral guide slot, and a lateral guide shaft in said guide slot carried by said cylinder block.

4. The combination of claim 1 wherein said guide plate consists of two members disposed on both sides of said slack portion and secured to said support member by rubber elements.

5. The combination of claim 1 wherein said friction element is a friction pad.

6. The combination of claim 1 wherein said tensioning means is a compression spring disposed on said cylinder block.

7. The combination of claim 1 wherein non-recoil means are operatively connected to said tensioning means to cooperate therewith.

References Cited in the file of this patent

UNITED STATES PATENTS

| | | |
|---|---|---|
| 1,261,156 | Norton | Apr. 2, 1918 |
| 2,893,255 | Bayliss | May 9, 1957 |

FOREIGN PATENTS

| | | |
|---|---|---|
| 962,341 | France | Dec. 5, 1949 |
| 742,092 | Great Britain | Dec. 21, 1955 |